July 25, 1961 G. P. COPPING ET AL 2,993,594
SEGREGATING APPARATUS

Filed April 7, 1958 9 Sheets-Sheet 1

GEOFFREY P. COPPING,
THOMAS R. MYERS,
DONALD J. PARKER,
INVENTORS

BY Hall + Houghton
ATTORNEY

July 25, 1961  G. P. COPPING ET AL  2,993,594
SEGREGATING APPARATUS

Filed April 7, 1958  9 Sheets-Sheet 3

GEOFFREY P. COPPING.
THOMAS R. MYERS.
DONALD J. PARKER,
INVENTORS

BY Hall-Houghton
ATTORNEY

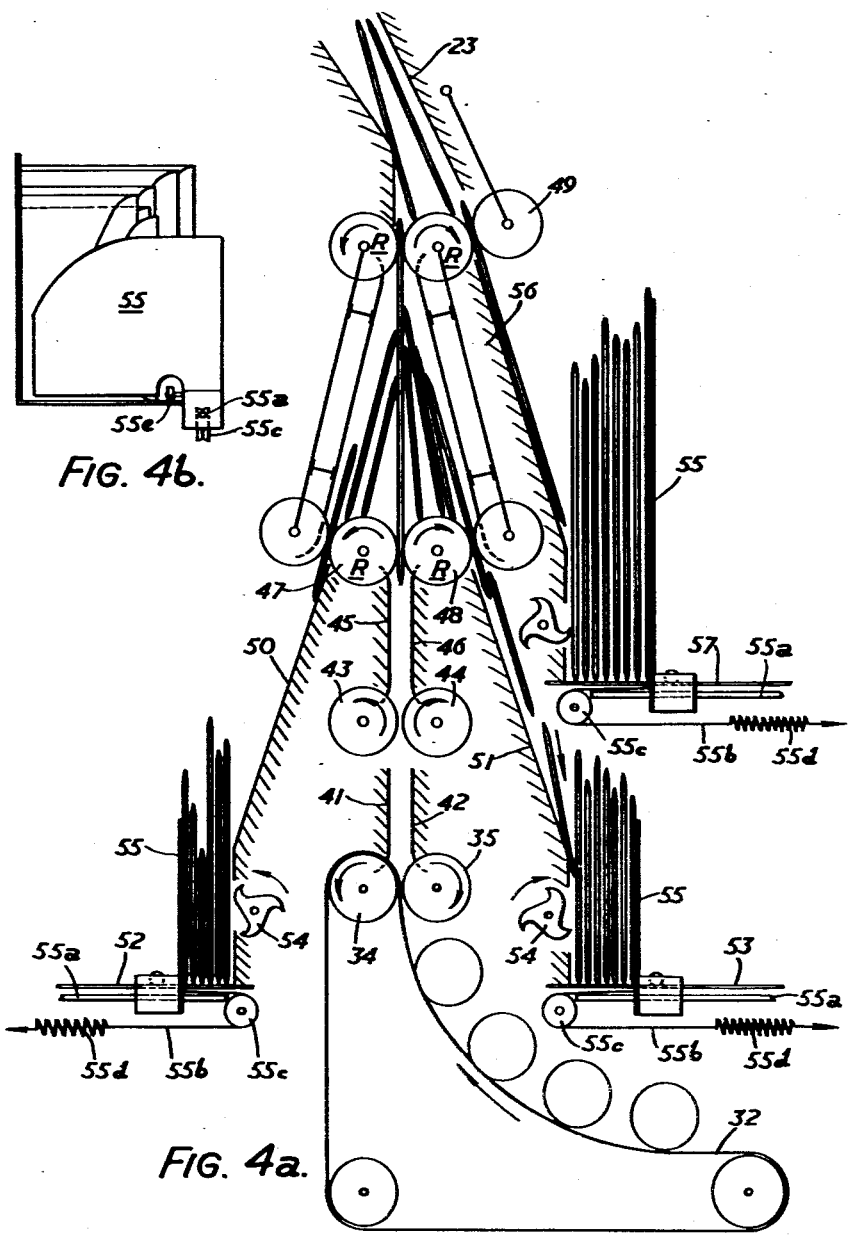

July 25, 1961 G. P. COPPING ET AL 2,993,594
SEGREGATING APPARATUS
Filed April 7, 1958 9 Sheets-Sheet 5

GEOFFREY P. COPPING,
THOMAS R. MYERS,
DONALD J. PARKER,
INVENTORS.

BY Hall & Houghton
ATTORNEY

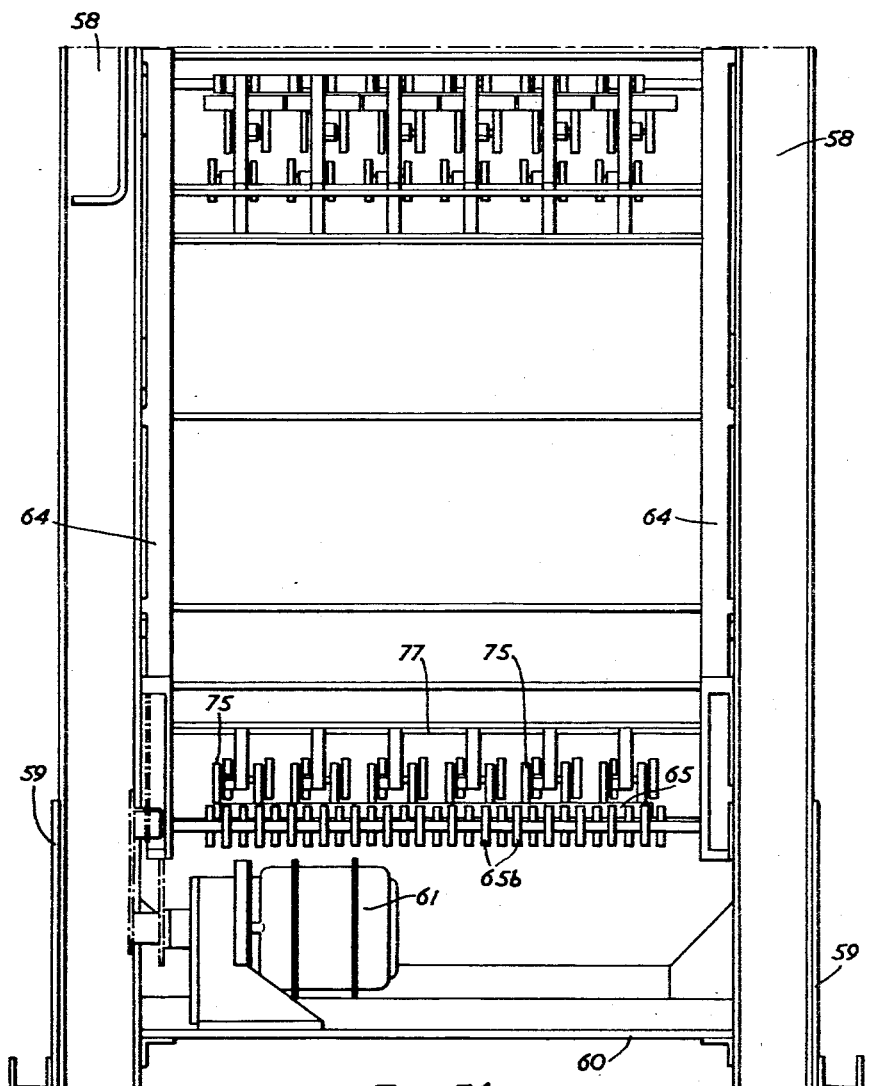

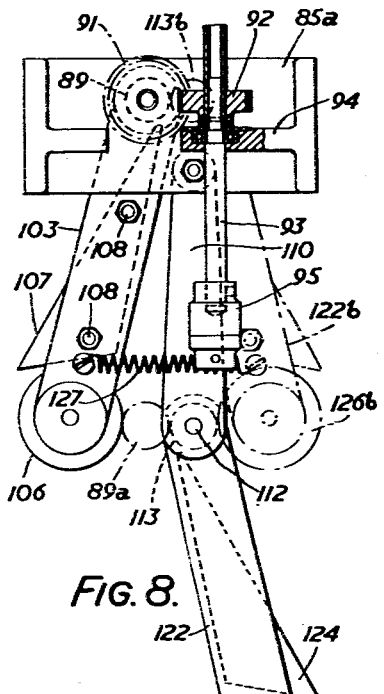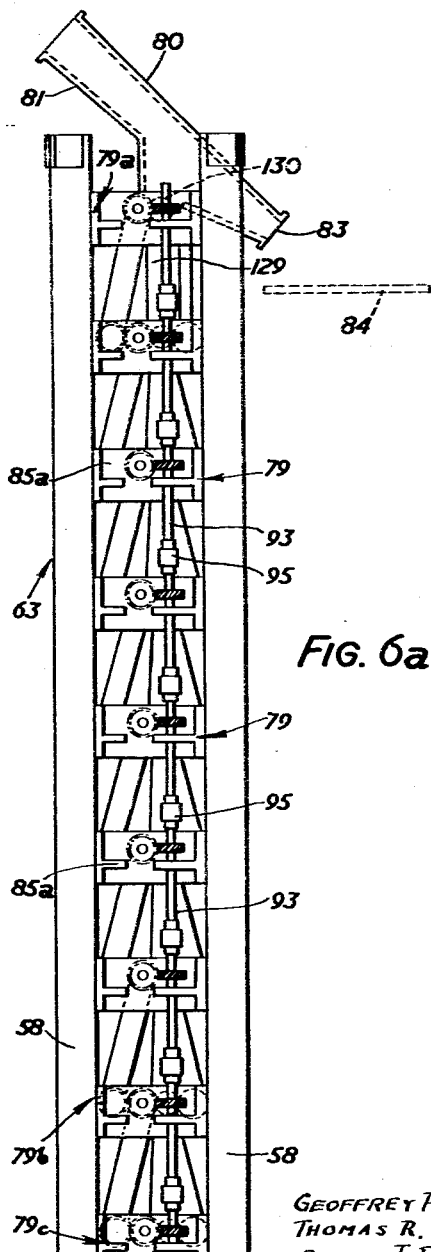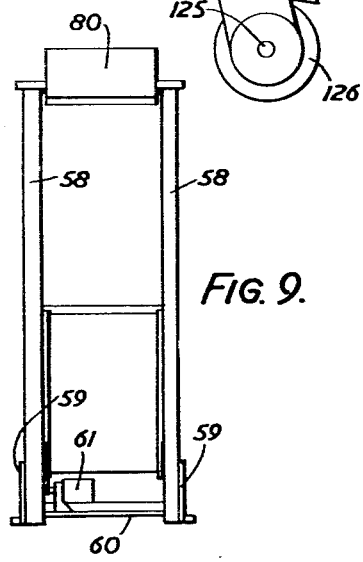

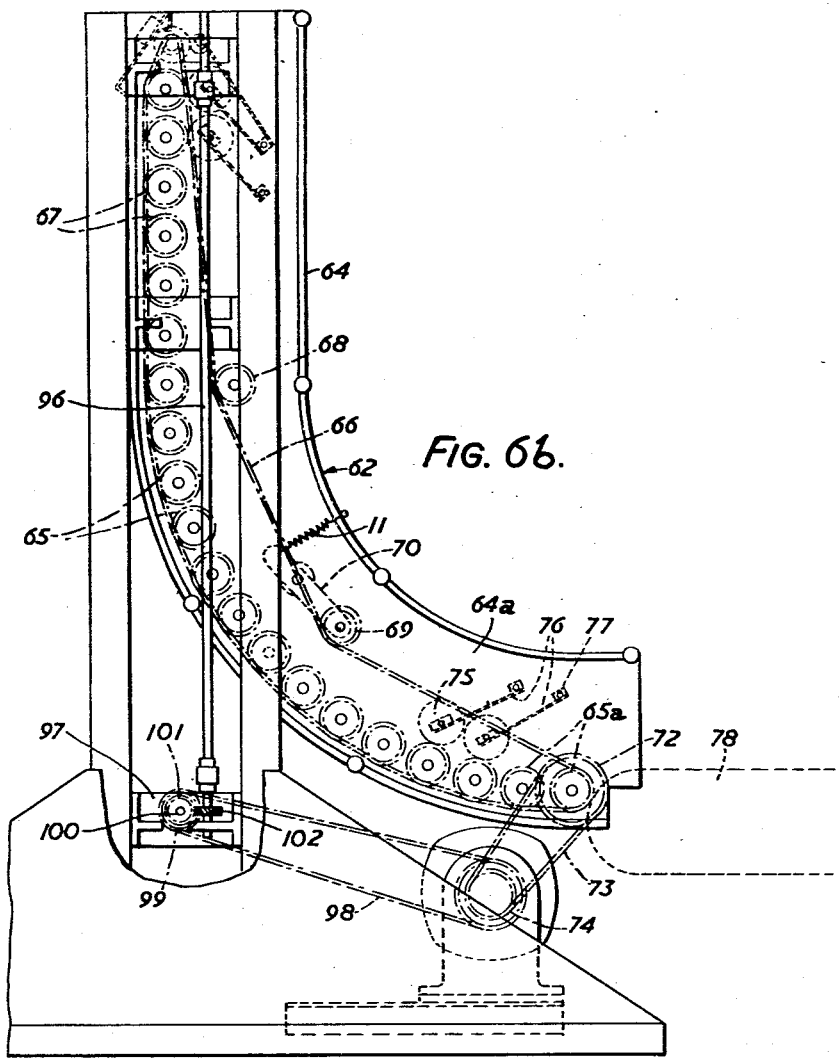

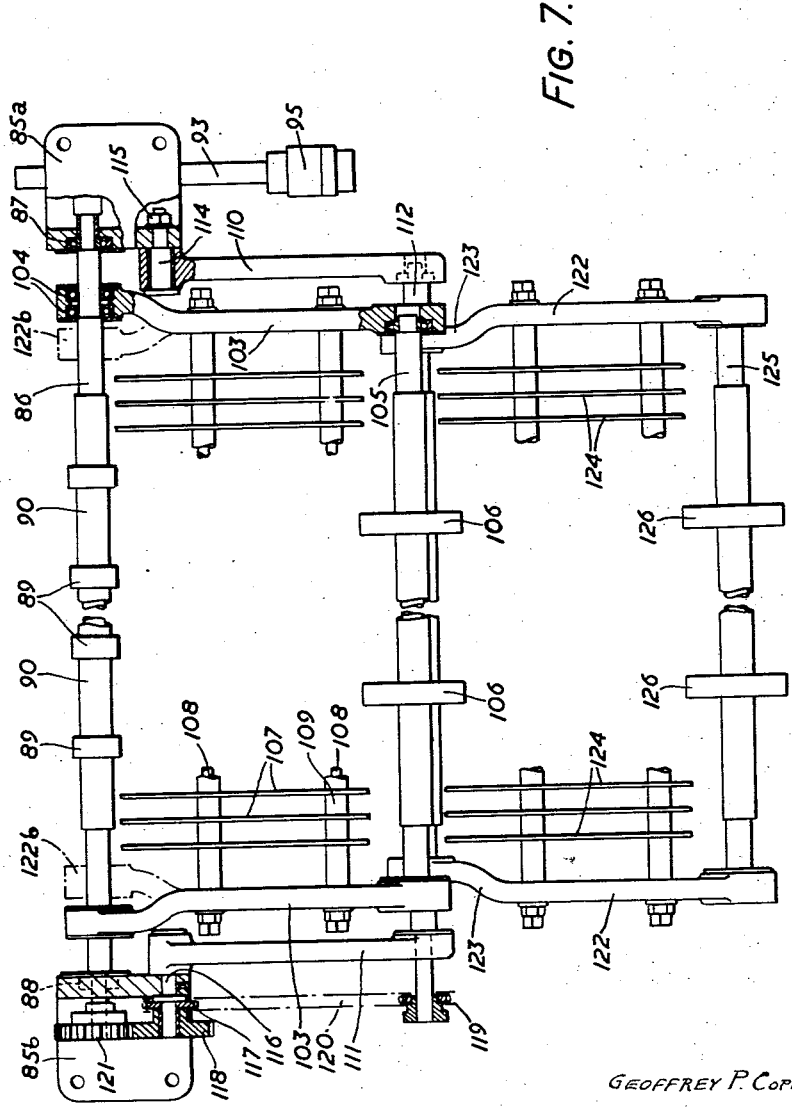

2,993,594
SEGREGATING APPARATUS
Geoffrey Percy Copping, Chesham, Thomas Roland Myers, Wembley Park, and Donald James Parker, Rickmansworth, England, assignors to Her Majesty's Postmaster General, London, England
Filed Apr. 7, 1958, Ser. No. 726,715
Claims priority, application Great Britain Apr. 11, 1957
7 Claims. (Cl. 209—106)

The present invention relates to segregating apparatus, more particularly for segregating from a stream of differently sized thin flat articles, such as for example letter mail, those articles having a dimension in the direction of movement of the stream which is less than a predetermined length.

According to the invention such apparatus comprises means for feeding the stream of articles upwardly to a first article-drive means for positively driving the articles upwardly through the apparatus, a second article-drive means vertically spaced from the first drive means for positively driving further upwardly articles fed thereto by the first drive means, the vertical spacing of the respective drive means providing a metering gap of a length equal to said predetermined length whereby only articles having the dimension in the direction of movement greater than the length of the metering gap are engaged by the second drive means to be driven further upwardly thereby, and means for discharging from the apparatus those articles which are not engaged by the second drive means.

Conveniently, the apparatus is such that those articles which after being driven upwardly by the first drive means are not engaged by the second drive means, are free to fall to be supported on edge on a movable support for delivering the articles thus supported to the said discharge means.

According to a further feature of the invention, the said movable support co-operates with the discharge means to ensure that the articles are discharged in overlapping relation, i.e. tiled with the overlap always on the same side. In this manner the discharged articles are in a condition suitable for stacking and according to a still further feature of the invention the said discharge means delivers the articles directly to an article stacking device.

The invention finds particular application in letter mail sorting apparatus for separating from a random stream of letter mail those letters which are too long for subsequent handling in automatic cancelling machines and require to be cancelled by hand. In the case of a random stream of letter mail delivered to the apparatus, however, letters may occur in bunches due to static charges or interlocking of flaps on the letters and other causes so that a bunch of letters delivered to the first drive means although consisting entirely of letters less than the predetermined length may bridge the metering gap so that some of the short letters will pass through the second drive means. It is therefore desirable to provide two or more metering gaps in succession so that a bunch of letters is broken down by passing through the successive drive means and short letters do not pass to the long letter output.

Alternatively, if it can be arranged that the apparatus is fed with a spaced stream of letters in which no letter is overlapped by another letter, it is possible by varying the length of successive metering gaps from a minimum in the lowest gap to a maximum in the uppermost gap to provide a means for grading the letters into different size groups corresponding to the respective dimensions of the metering gaps.

Furthermore, in the case of a random stream of letter mail it may occur that a long letter is presented to the first drive means with its shorter dimension extending in the direction of feed so that the letter would fail to bridge the metering gap and would be discharged with the short letters. It is therefore desirable that the output from the short letter discharge means be fed to a further similar segregator in a single stream in a direction at right angles to the stream entering the first segregator, thereby ensuring that a long letter discharged from the short letter discharge means in the manner hereinbefore described will be presented to the second segregating apparatus with its longer dimension extending in the direction of feed, thereby ensuring that the long letter will be properly segregated in the second apparatus. The second apparatus could then be provided with letter stacking devices or boxes to which the short letters and the long letters are fed directly from the respective discharge means.

The invention will now be described with reference to the accompanying drawings, in which:

FIGURES 4a and 4b show diagrammatically a further form of segregator according to the invention suitable for use as a second segregator;

Figure 5A:
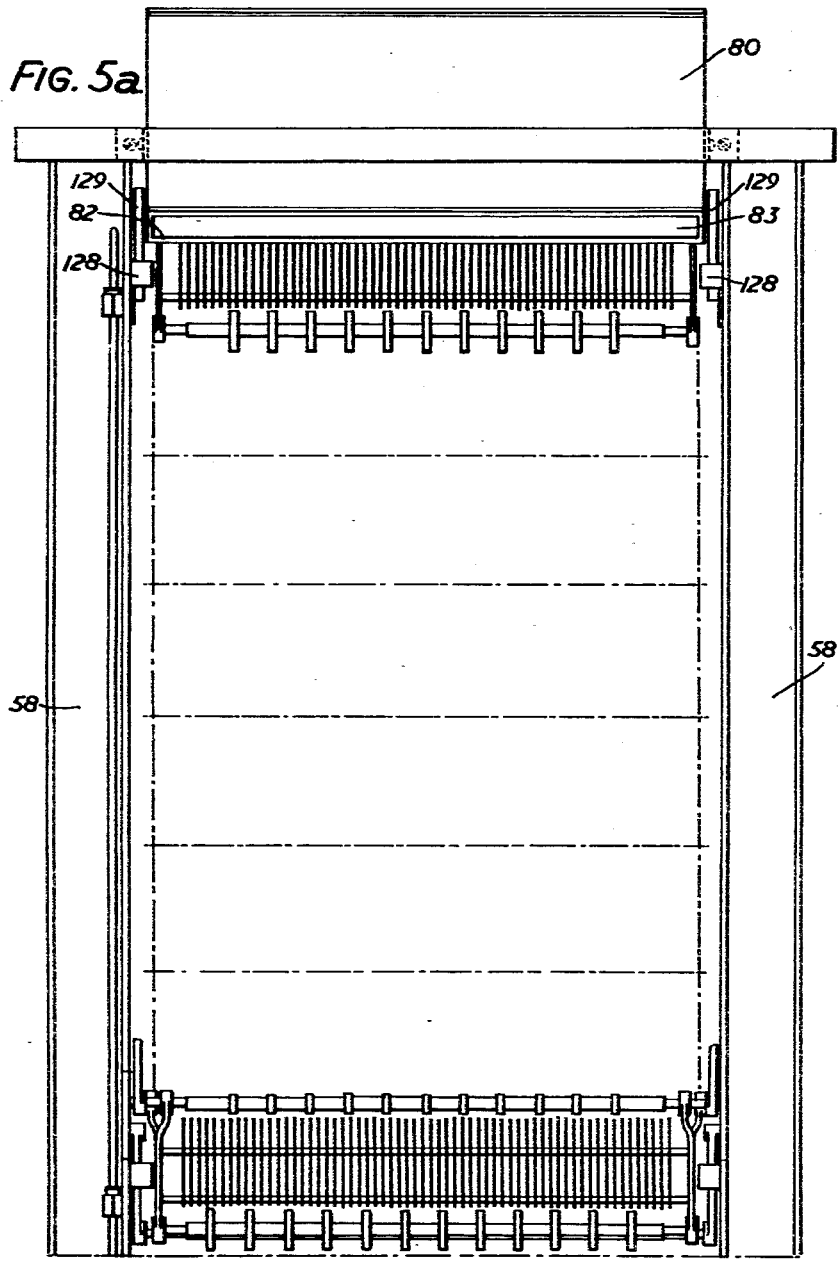

FIGURES 5a and 5b respectively represent a front elevation of a letter segregating apparatus according to the invention;

FIGURES 6a and 6b respectively represent a side elevation of the apparatus of FIGURES 5a and 5b;

FIGURE 7 is a front elevation drawn to an enlarged scale of a unitary sub-assembly of the apparatus of FIGURE 5a;

FIGURE 8 is a side elevation of the sub-assembly of FIGURE 7; and

FIGURE 9 is a front elevation drawn to a reduced scale of a complete segregator unit.

Figure 1:
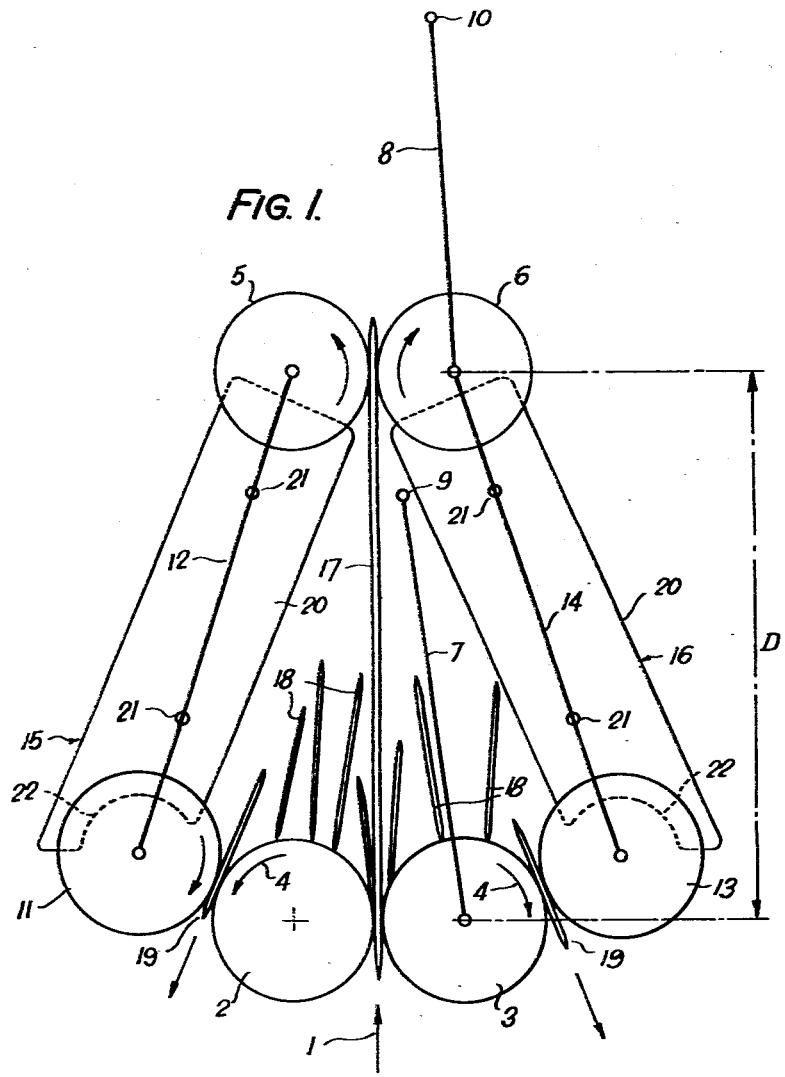
FIGURE 1 is a diagrammatic representation of a simple form of apparatus according to the invention.

Referring firstly to FIGURE 1 of the drawings, a random stream of letter mail is fed by suitable feed means (not shown) so as to be presented in a vertically upward direction indicated by the arrow 1 to the bite of a pair of power-driven feed rollers 2 and 3, which are positively rotated in the direction of the arrow 4 so as to feed the letters presented thereto upwardly through the apparatus. A second pair of power-driven feed rollers 5 and 6 is positioned vertically above the pair of rollers 2 and 3 and spaced therefrom a distance D equal to the minimum length of long letter which it is desired to segregate, the separation D of the two pairs of drive rollers thus constituting a metering gap. Each of the driven rollers 3 and 6 is suspended at the lower end of a downwardly depending arm 7 and 8 respectively, the upper ends of which arms are pivoted upon fixed pivots 9 and 10 respectively. The rollers 3 and 6 can therefore swing outwardly away from the co-operating rollers 2 and 5 to accommodate varying thickness of letters or bunches of letters which may be presented between the rollers.

An idling discharge roller 11 is suspended from the axis of the upper driven roller 5 by means of a pivoted arm 12, the discharge roller 11 thus being gravity urged into engagement with the lower drive roller 2 to form therewith a discharge means for the short letters as will hereinafter be described. A further idling discharge roller 13 is supported in a similar manner by a pivoted arm 14 for engagement with the lower drive roller 3 to form a second discharge means for the short letters. Secured to the pivot arms 12 and 14 respectively are guides 15 and 16 for guiding the short letters towards the discharge points.

As shown in the figure a long letter, i.e. a letter having a dimension greater than the length of metering gap D and extending in the direction of feed as indicated at 17, will be fed upwardly by the first pair of drive rollers 2 and 3 into the bite of the second pair of rollers 5 and 6 which will feed the letter further upwardly through the apparatus. Letters of which the dimension in the direction of feed is less than the length of the metering gap D are fed upwardly by the lower pair of feed rollers 2 and 3 but are not engaged by the upper feed rollers and fall back under the action of gravity to rest on edge on the periphery of the drive rollers 2 and 3 as indicated at 18. The peripheral surface of the drive rollers 2 and 3 thus provides a movable support for the short letters, moving in a direction away from the bite of the rollers 2 and 3 and towards the discharge points provided by the discharge rollers 11 and 13 respectively so that the lower edges of the short letters are presented between the discharge roller 11 and the drive roller 2 or between the discharge roller 13 and the drive roller 3 to be discharged downwardly thereby as indicated at 19. The upper edges of the short letters supported on the drive roller 2 or 3 are constrained by the guides 15 and 16 to prevent the letters toppling laterally outwards.

The guides 15 and 16 are formed by a number of small deflector plates 20 supported in spaced parallel relation in the direction of the axis of the rollers by fixing bolts 21 secured to the arms 12 and 14 respectively. The plates 20 are thus supported on the arms 12 and 14 for movement therewith so that they will always take up correct position depending on the thickness of the letter passing between the drive roller and the corresponding discharge roller. In addition, the spacing of the plates which from the face of the apparatus are seen edgewise permits the letters passing through the metering gap to be observed so that, should a letter become jammed, the necessary action can be taken to free it.

The driven and discharge rollers shown endwise in FIGURE 1 need not be in the form of solid cylinders but may consist of a number of disc-like rollers spaced along the length of a comparatively thin spindle. Conveniently, the spacing of the rollers is made such that the spaced guide plates 20 interleave with the rollers as shown at 22. In addition the said disc construction of roller facilitates the breaking-up of bunches of letters due to the uneven distribution of pressure on the letters by the rollers.

Figure 2:
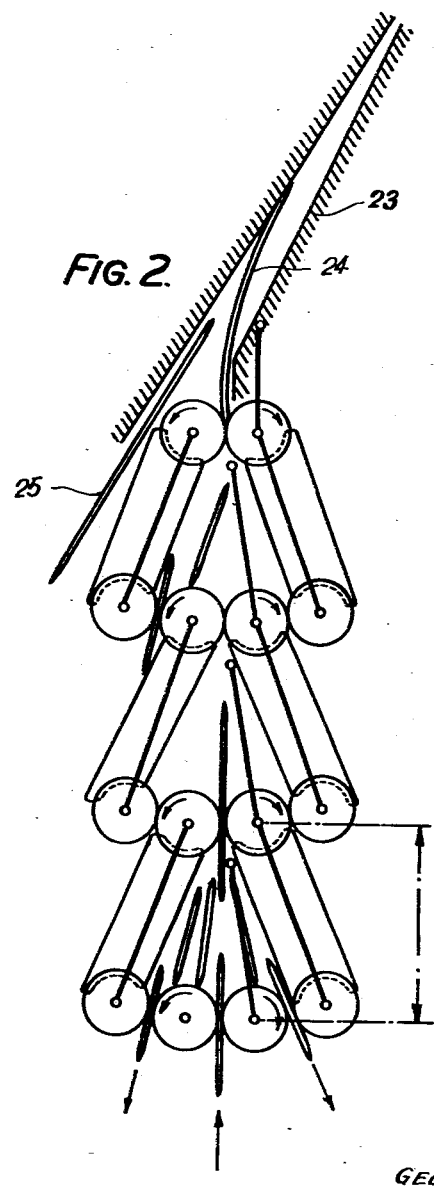
FIGURE 2 is a diagrammatic representation of a letter mail segregating apparatus according to the invention.

As hereinbefore mentioned, in the handling of random letter mail it is desirable to provide more than one metering gap in order to ensure the breaking-up of bunches of letters and in FIGURE 2 there is shown diagrammatically one form of such apparatus which provides three metering gaps in succession. The arrangement of rollers providing each metering gap is similar to that described with reference to FIGURE 1 and need not be entered into in more detail. In the apparatus of FIGURE 2, however, the uppermost pair of drive rollers delivers the long letters into an inclined chute 23 and a long letter delivered into the chute as indicated at 24 will fall back with its lower edge resting on the periphery of the left-hand drive roller (as viewed in FIGURE 2) to be moved outwardly thereby and discharged as at 25. It will be apparent that the arrangement of FIGURE 2 provides three short letter discharges at each side of the apparatus and it is therefore possible by varying the length of the successive metering gaps from a minimum in the lowest gap to a maximum for the uppermost gap to provide a means for grading the letters into differernt size groups, the shortest letters being discharged from the lowermost discharge points and so on until the longest letters are discharged into the chute 23 by the uppermost pair of drive rollers.

As previously indicated, it is possible that a long letter passes into the apparatus with its shorter dimension extending in the direction of feed so that the letter will be discharged from the short letter discharge. It is therefore desirable to feed the letters issuing from the short letter discharge to a further segregator in such manner as to ensure that any long letter is presented to the further segregator with its longer dimension extending in the direction of feed. For this purpose it is necessary that the letters issuing from the first segregator be presented to the second segregator in a narrow stream.

The formation of the narrow stream can be effected in many ways, such as for example, by collecting the output of small letters from the first segregator in a V conveyor in which the letters rest on edge in a vertical plane upon an inclined belt which is divided into sections along its length and driven so that the letters are subjected to acceleration and bumping as they are carried along the V conveyor. The conveyor may, for example, be approximately 8 feet long with three or four steps between belt sections, so that by the time the letters reach the end of the conveyor they are resting in a stable state upon their longer edges. The V conveyor then widens to permit the letters to fall flat upon the conveyor belt thereby forming a narrow stream of letters with their longer dimension extending in the direction of the stream, suitable for feeding to the second segregator.

Figure 3:
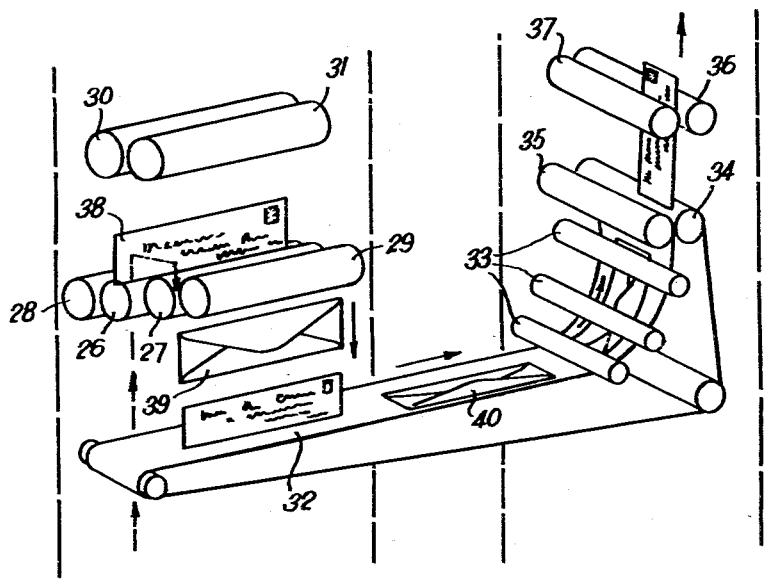
FIGURE 3 shows in diagrammatic form the manner in which a long letter not segregated by a first segregator is fed to a second segregator.

For the purposes of illustration, however, there is shown in FIGURE 3 in purely diagrammatic form a very simplified arrangement. In FIGURE 3 there is shown at 26 and 27 the lowermost feed rollers of a first segregator, at 28 and 29 the discharge rollers which co-operate with the driven rollers 26 and 27 respectively to discharge the short letters from the segregator, and at 30 and 31 the upper pair of drive rollers. Below the discharge provided by the driven roller 27 and the discharge roller 29 and extending parallel to the axis of the rollers is a conveyor belt 32 for conveying the letters to a second segregator. The belt 32 at the second segregator passes under a curved array of rollers 33 and over one of the lowermost pair of drive rollers 34 and 35 of the second segregator, the upper drive rollers of which are shown at 36 and 37, the drive rollers of the second segregator being arranged with their axes at right angles to the axes of the rollers of the first segregator. At 38 there is shown a long letter which has passed through the lower drive rollers of the first segregator with its narrow dimension in the direction of feed so that the letter is not engaged by the upper drive rollers and is discharged with the short letters as shown at 39. The long letter thus discharged falls upon the belt 32 to lie flat thereon with its long dimension in the direction of feed as shown at 40 and while in this position is fed into the second segregator and is gripped by the upper drive rollers 36 and 37 for delivery to the long letter discharge. The rollers shown in FIGURE 3 are purely diagrammatic since, as hereinbefore stated, it is preferred to form the rollers of a plurality of spaced discs.

As hereinbefore pointed out, the short letters are discharged in a tiled condition suitable for stacking and the second segregator may therefore be provided with means for stacking the discharged letters. One such arrangement is shown in FIGURE 4a in which a letter delivered by the belt 32 to the lower drive rollers 34 and 35 is fed thereby upwardly between fixed guide plates 41 and 42, a further pair of driven rollers 43 and 44, further fixed guide plates 45 and 46 to a pair of driven rollers 47 and 48 defining the lower end of the metering gap. The arrangement is then similar to that shown in FIGURE 2 except that for convenience in FIGURE 4a only one metering gap is shown, and an idler roller 49 engages one of the drive rollers of the uppermost pair of drive rollers for positively discharging the long letters from the chute 23. Beneath the discharge provided by the lower drive rollers 47 and 48 and their respective idler or discharge rollers, further fixed guide plates 50 and 51 slope outwardly downwardly to guide discharged letters to stacking devices 52 and 53 respectively in each of which the letters are stacked by a rotating star wheel 54 against a back-rest 55. In a similar manner a fixed guide plate 56 extends downwardly from the long letter discharge to deliver the letters to a stacking device 57. As stated there may be more than the one metering gap shown in FIGURE 4a, in which case there would be provided further stacking devices for stacking the letters issuing from the feed rollers at the lower end of each metering gap.

As clearly shown in FIGURES 4a and 4b each back-rest comprises a plate 55 slidably supported upon a rod 55a and spring loaded into engagement with the stack of letters by means of a cord or the like 55b passing over a pulley 55c and anchored by means of a tension spring 55d to a fixed part of the apparatus. In order to support the back-rest clear of the floor of the stacking device a small roller 55e (FIGURE 4b) engages the edge of the floor while permitting the back-rest 55 to be swung upwardly about the rod 55a when it is required to remove stacked letters from the stack.

In operating the first segregator to which the random stream of mail is fed, it is essential that the letters flow in a fairly thin stream and in order to permit this and at the same time handle a heavy flow of mail the rollers are made of a length not less than 3 feet. Furthermore, and as previously stated, it is desirable to provide more than one metering gap in order to break up any small bunches of letters which may be fed to the apparatus and in practice it has been found that, by providing eight vertically spaced pairs of feed rollers, the segregation of the letters is effected efficiently with only a negligible percentage of short letters being carried over with the long ones.

One practical embodiment of such a first segregator is shown in FIGURES 5 to 9 and, as will be apparent from FIGURES 5 and 6, the apparatus is in the form of an upwardly extending structure or tower comprising two pairs of channel-section uprights 58 each pair of which is secured at the lower end of floor engaging brackets 59 at each side of the segregator, the said brackets supporting therebetween a base 60 upon which is mounted an electric motor 61 drivingly connected to the drive rollers of the apparatus in a manner hereinafter to be described.

The apparatus comprises a lower or letter-entering portion indicated generally at 62 (FIGURES 5b and 6b) and an upper segregating portion indicated generally at 63 (FIGS. 5a and 6a). The letter-entering portion 62 comprises two side plates 64 secured to the respective pairs of uprights 58, the said side plates extending vertically downwardly and then curving outwardly and forwardly as at 64a to assume a horizontal position. Journalled in the side plates 64 is an arcuate array of driven rollers 65, the said array extending upwardly to the end of the plates 64. The rollers 65 are driven by a common drive chain 66 which passes over sprockets 67 secured to the roller spindles at one side of the apparatus, the chain 66 passing over an idler sprocket 68 and a tensioning sprocket 69 supported at one end of a pivoted arm 70 and spring loaded into engagement with the chain by means of a spring 71. The spindle of the lowermost roller 65 also has secured thereto a sprocket 72 driven by a chain 73 from a sprocket 74 mounted on the shaft of the motor 61.

Each of the rollers 65, with the exception of the lowermost two rollers, is in the form of an elongated cylinder extending substantially across the width of the apparatus and each roller is engaged by a plurality of pairs of idler rollers 75 each pair of which is supported at one end of a spring arm 76 the other end of which is anchored to a rod 77 extending between the side plates 64, the rollers 75 being thus spring urged into engagement with the corresponding roller 65. The two lowermost rollers 65 indicated at 65a take the form of a plurality of spaced disc-like rollers 65b spaced along the length of a spindle, the discs of one roller being staggered with respect to those of the other. The letters to be segregated are fed to the apparatus by conveyor means, such as a conveyor belt, indicated in broken line at 78 and after passing over the lowermost two rollers 65a are engaged between the subsequent rollers 65 and the cooperating idler rollers 75 and are thus fed upwardly to the top of the letter-entering portion 62. The rollers 65a are made in the form described because in a random stream of letter mail, as would be delivered by the conveyor 78, quantities of loose pieces of string, scraps of paper and like extraneous matter are interspersed with the letters and by passing the letters over the rollers 65a the extraneous matter drops through the spacing between the rollers 65b and can be collected in a suitable receptacle (not shown).

The segregating portion 63 is formed to provide eight metering gaps through which the letters are fed upwardly from the entering portion 62, the said metering gaps being provided by a plurality of unitary sub-assemblies 79 extending across the width of the apparatus and secured to the uprights 58 at each end, the sub-assemblies comprising driven and idler rollers pivotally supported in the manner described with reference to FIGURE 2. The sub-assemblies 79 are identical with the exception of the two lower assemblies 79b and 79c respectively as will be hereinafter more fully described. The driven roller of the uppper assembly 79a co-operates with an idler roller 130 supported as hereinafter described to provide a pair of feed rollers by which long letters which have passed successively through the metering gaps are fed upwardly into an inclined chute formed by plates 80, 81 and 82 secured to the upper end of the uprights 58 and extending across the width of the apparatus, the said plates providing an exit 83 through which the long letters drop on to a conveyor means indicated in broken line at 84 for delivering to a cancelling position.

A typical sub-assembly 79 is shown in more detail in FIGURES 7 and 8 in which FIGURE 7 is a front elevation and FIGURE 8 is a side elevation viewed from the right of FIGURE 7. Each sub-assembly comprises a pair of end brackets 85a and 85b adapted to be secured between the uprights 58 at each side of the apparatus as shown in FIGURE 6. A driven spindle 86 extends between the end brackets 85a and 85b and is journalled therein by ball bearings 87 and 88 respectively. The spindle 86 has secured thereon a plurality of spaced rollers 89 (corresponding to the drive roller 5 of FIGURE 1), the rollers 89 being spaced by spacer sleeves 90. The spindle 86 extends at one end beyond the bearing 87 to receive a gear 91 which meshes with a helical gear 92 supported upon a vertical drive shaft 93 journalled in a horizontal flange 94 of the end bracket 85a, the shaft 93 being provided at its lower end with a coupling 95 for securing the shaft to a similar shaft of the sub-assembly immediately below as will be clearly seen in FIGURE 6.

The drive shaft 93 of the lowermost sub-assembly is connected to a shaft 96 (FIGURE 6b) which extends downwardly to the base of the apparatus and is supported by a bracket 97 to be driven by means of the motor 61 through a chain 98 driving a sprocket 99 on a shaft 100 having mounted thereon a gear 101 meshing with a gear 102 on the shaft 96. It will be apparent that the assembly of the several drive shafts 93 and the shaft 96 provides a means for driving simultaneously all the spindles 86 of the sub-assemblies 79.

A pair of arms 103 is supported from the spindle 86—there being one arm adjacent each end of the spindle—and journalled thereon by ball bearings 104, the arms 103 carrying at their lower ends a spindle 105 journalled therein and carrying a plurality of spaced discharge rollers 106 (corresponding to the rollers 11 of FIGURE 1). The arms 103 support a plurality of spaced deflector plates 107 secured thereto by means of bolts 108 upon which the plates 107 are positioned by means of spacing collars 109 (the plates 107 corresponding to the plates 20 of FIGURE 1).

A further pair of arms 110 and 111 respectively is pivotally supported by the brackets 85a and 85b respectively and depend downwardly therefrom to receive a spindle 112 journalled therein, the spindle 112 carrying a plurality of rollers 113 similar to the rollers 89 and corresponding to the rollers 3 of FIGURE 1. The arm 110 is pivotally supported on the bracket 85a by means of a stub shaft 114 secured in the bracket by means of a nut 115, while the arm 111 is supported on the bracket 85b by a stub shaft 116 which also supports a chain sprocket 117 and a spur gear 118 secured together and freely rotatable on the stub shaft 116. The spindle 112 extends through the arm 111 to receive a chain sprocket 119 secured thereon and driven from the chain sprocket 117 by means of a chain 120. The spur gear 118 meshes with a spur gear 121 secured to an extension of the spindle 86 which, as hereinbefore described, is driven from the vertical shaft 93. The spindle 112 is thus driven together with the spindle 86 from the shaft 93 through the spur gears 121, 118 and chain sprockets 117 and 119.

The spindle 112 supports a pair of arms 122 similar to the arms 103 and journalled thereon in a manner similar to that in which the arms 103 are journalled on the spindle 86 with the exception that the upper ends of the arms 122 are inwardly off-set as at 123, while the arms 103 are outwardly off-set. The arms 122 carry deflector plates 124 and support at their lower ends a spindle 125 journalled therein and carrying spaced discharge rollers 126 (corresponding to the rollers 13 of FIGURE 1). The assembly of the arms 122, plates 124, spindle 125 and rollers 126 is identical to that described with reference to the arms 103 and will therefore not be referred to in greater detail.

In FIGURE 8 the co-operating portions of the sub-assemblies immediately above and below are shown in broken line and, as will be seen, when the assemblies are mounted in position the rollers 113 of one sub-assembly engage the driven rollers 89a of the sub-assembly immediately below, which rollers 89a are also engaged by the discharge rollers 106 of the said one sub-assembly, the driven rollers 89 of which are in turn engaged by the rollers 113b of the sub-assembly immediately above. The rollers 113 of the said one sub-assembly are also engaged by the discharge rollers 126b supported by arms 122b of the sub-assembly immediately above while the discharge rollers 126 of the said one sub-assembly engage the rollers 113 (not shown) of the sub-assembly immediately below.

It will be seen therefore that by mounting the sub-assemblies 79 one above another, as described, there is provided a plurality of upwardly ascending metering gaps provided by the rollers 89 and 113 of the respective sub-assemblies through which the letters are passed upwardly in the manner described with reference to FIGURE 2, and a plurality of discharge points provided by the co-operating rollers 106 and 89, and 126 and 113 respectively for discharging the letters as described with reference to FIGURE 2. After mounting the sub-assemblies the respective arms 103 and 122b are connected together by means of tension springs 127 thereby to provide biasing means urging the rollers 106 and 126b into engagement respectively with the rollers 89a and 113 and also the rollers 89a into engagement with the rollers 113.

At their upper end the uprights 58 at each side of the apparatus support blocks 128 upon which are mounted leaf springs 129 carrying the idler roller 130 and urging it into engagement with the driven roller 89 of the upper sub-assembly 79a, the spindle of the said idler roller 130 supporting further arms carrying at their lower end rollers similar to the rollers 126 for engaging the rollers 113 of the sub-assembly immediately below. The driven rollers 89 of the uppermost sub-assembly 79a together with the said idler roller 130 constitute an upper discharge means by which long letters which have passed successively through the metering gaps are fed into the chute formed by the plates 80 and 81 to drop therefrom on to the conveyor means 84. It will be noted that the roller 130 is not a driven roller but it is found that this arrangement works satisfactorily since any bunches of letters occurring in the random stream delivered to the apparatus will have been broken up in passing through the successive metering gaps so that only single letters will be presented to the uppermost feed rollers 89 and 130, the drive to the long letters reaching the uppermost sub-assembly being maintained by the driven roller 89 of that sub-assembly.

The sub-assembly 79b is a modified version of the sub-assembly 79 in which the lower arms 122 and rollers 126 are omitted, while the sub-assembly 79c which is the lowermost of the sub-assemblies comprises solely the driven rollers 89 which are engaged by the rollers 113 of the sub-assembly 79b, which are themselves engaged by the rollers 126 of the sub-assembly 79 immediately above the sub-assembly 79b. The rollers 89 of the sub-assembly 79c are in turn engaged by the rollers 106 of the sub-assembly 79b. The lowermost sub-assembly 79c thus provides an infeed formed by the rollers 89 thereof and the co-operating rollers 113 of the sub-assembly 79b into which infeed the letters are delivered from the upper end of the letter-entering portion 62.

In operation of the apparatus described, the letters are fed thereto in a random stream extending across the width of the apparatus upon the conveyor 78 to be carried upwardly in the letter-entering portion 62 and from thence are fed successively upwards through the metering gaps provided between the sub-assemblies 79 and the long letters which reach the uppermost sub-assembly 79a are discharged into the inclined chute at the top of the apparatus and fall upon the conveyor means 84. As described with reference to FIGURE 2, the letters having a length in the direction of feed less than the metering gap are discharged from the sub-assemblies 79 to fall downwardly on to conveyor means (not shown in FIGURES 5 and 6), which conveyor means conveniently convey the letters to a further segregating apparatus in the manner described with reference to FIGURE 3. The said further segregating apparatus conveniently includes stacking means as described with reference to FIGURES 4a and 4b.

We claim:

1. Segregating apparatus for segregating from a stream of differently sized thin flat articles those articles having a dimension in the direction of movement of the stream which is less than a predetermined length, the said apparatus comprising a first pair of driven feed rollers, means for feeding the articles upwardly into the bite of said first pair of feed rollers to be positively driven thereby upwardly through the apparatus, a second pair of driven feed rollers positioned vertically above and spaced from the first pair of feed rollers for positively driving further upwardly articles fed thereto by the first pair of feed rollers, the vertical spacing of the respective pairs of feed rollers providing a metering gap of a length equal to said predetermined length whereby only articles having the dimension in the direction of movement greater than the length of the metering gap are engaged by the second pair of feed rollers to be driven further upwardly thereby, and those articles not engaged by the second pair of feed rollers rest on edge on the peripheral surface of the first pair of feed rollers, and discharge rollers engaging the feed rollers and co-operating therewith to discharge downwardly the articles supported on edge on the feed rollers and moved towards the discharge rollers by the rotation of the feed rollers.

2. Segregating apparatus according to claim 1 further comprising downwardly extending pivoted arms for supporting said discharge rollers, and deflector plates carried by said pivoted arms for guiding articles as they are discharged by the respective discharge rollers.

3. A letter segregating apparatus for segregating from a random stream of letter mail fed thereto letters having a dimension in the direction of feed exceeding a predetermined length, comprising an upwardly extending structure or tower, a plurality of pairs of feed rollers extending across the structure and positioned vertically one above another and spaced one from another to provide metering gaps of a length equal to said predetermined length, means for feeding the letters to the lowermost pair of feed rollers, discharge rollers co-operating with the rollers of each pair of feed rollers for discharging from each metering gap letters having a dimension in the direction of feed less than the said predetermined length and which upon being fed into the gap by the lower pair of feed rollers thereof are not engaged by the upper pair of feed rollers of the gap and thereby fall to rest on edge on the said lower feed rollers to be fed thereby towards the said discharge rollers for discharge thereby, discharge means positioned above the uppermost pair of rollers for discharging letters of a length exceeding the said predetermined length which are fed thereto by the said uppermost pair of feed rollers, and drive means for simultaneously driving the said plurality of pairs of feed rollers.

4. A letter segregating apparatus according to claim 3, wherein the apparatus includes a letter-entering portion for feeding the letters into the bite of the lowermost pair of feed rollers, the said letter-entering portion comprising an arcuate array of driven rollers curving upwardly to the said lowermost pair of feed rollers, and idler rollers co-operating with rollers of the said arcuate array whereby letters fed to the said letter-entering portion are engaged between the rollers of the arcuate array and their corresponding idler rollers to be fed upwardly to the said lowermost pair of feed rollers.

5. A letter segregating apparatus according to claim 4, wherein the said arcuate array includes two lowermost driven rollers not engaged by idler rollers and each comprising a plurality of disc-like rollers spaced lengthwise of a spindle whereby as the stream of letters is fed over the said lowermost rollers, pieces of string, scraps of paper, or like extraneous matter contained in the stream are separated therefrom to fall between the spaced disc-like rollers.

6. A letter segregating apparatus according to claim 3, comprising a plurality of unitary sub-assemblies assembled in vertical spaced relation between upright supporting members at each side of the apparatus, each said sub-assembly comprising a driven first feed roller, a spindle for rotatably supporting said first feed roller, a first pair of depending arms pivoted on the said spindle, a first discharge roller rotatably supported at the lower end of said first pair of arms for engaging the driven first feed roller of the sub-assembly immediately below, a second pair of depending arms pivotally supported on the sub-assembly, a driven second feed roller rotatably supported at the lower end of said second pair of arms for engaging the driven first feed roller of the sub-assembly immediately below, a spindle rotatably supporting said second feed roller, a third pair of depending arms pivoted on the spindle of said second feed roller and a second discharge roller supported at the lower end of said third pair of arms for engaging the driven second feed roller of the sub-assembly immediately below said second mentioned sub-assembly.

7. A letter segregating equipment comprising a first and a second letter segregating apparatus, each comprising a first letter drive means for positively driving the letters upwardly through the apparatus, means for feeding a stream of letters upwardly to the said first drive means, a second drive means positioned vertically above and spaced from the first drive means for positively driving further upwardly letters fed thereto by the first drive means, whereby only letters having a dimension in the direction of movement greater than the vertical spacing of said first and second drive means are engaged by the second drive means to be further driven upwardly thereby, a first discharge means for discharging from the apparatus those letters which are not engaged by the second drive means and a second discharge means for discharging letters driven upwardly by said second drive means, a first conveyor for conveying a random stream of letters to the said first segregating apparatus, a second conveyor for receiving letters discharged from the first discharge means of the first apparatus and for conveying the said discharged letters to the second apparatus in such a way that any long letter, i.e. a letter having a dimension exceeding the spacing between the first and second drive means of the first apparatus and which may have been discharged from the first letter discharge means of the first apparatus through being presented thereto with its shorter dimension in the direction of feed, is conveyed to the second apparatus with its longer dimension extending in the direction of feed thereto, thereby to ensure its segregation in the second apparatus.

References Cited in the file of this patent

UNITED STATES PATENTS

| | | |
|---|---|---|
| 1,814,633 | Ryder et al. | July 14, 1931 |
| 2,119,919 | Knight et al. | June 7, 1938 |
| 2,138,645 | Rey | Nov. 29, 1938 |